United States Patent [19]

Bantz et al.

[11] 3,848,460

[45] Nov. 19, 1974

[54] METHOD AND APPARATUS FOR MEASURING THE VELOCITY OF SOUND IN A WORKPIECE

[75] Inventors: Walter J. Bantz, Newark, Ohio; John W. Couture, Brookfield; Richard J. Pittaro, Stamford, both of Conn.

[73] Assignee: Krautkramer-Branson, Incorporated, Stamford, Conn.

[22] Filed: Oct. 31, 1973

[21] Appl. No.: 411,376

Related U.S. Application Data

[63] Continuation-in-part of Ser. No. 262,233, June 13, 1972, abandoned.

[52] U.S. Cl. .............................. 73/67.5 R, 73/67.9
[51] Int. Cl. ........................................... G01n 29/04
[58] Field of Search .............. 73/67.5 R, 67.6, 67.7, 73/67.8 R

[56] References Cited
UNITED STATES PATENTS

| 3,461,030 | 8/1969 | Keyes | 73/194 R |
| 3,554,014 | 1/1971 | Berg et al. | 73/67.8 R |
| 3,603,136 | 9/1971 | Diamond et al. | 73/67.8 R |
| 3,690,155 | 9/1972 | Eichler | 73/67.5 R |

Primary Examiner—Richard C. Queisser
Assistant Examiner—John P. Beauchamp
Attorney, Agent, or Firm—Ervin B. Steinberg

[57] ABSTRACT

The velocity of sound in a workpiece is determined by arranging a transmit and a receive ultrasonic transducer a predetermined distance apart from each other in a liquid bath. Cyclically a workpiece whose sound velocity is to be measured is placed in the space between the transducers. The transit time of an ultrasonic signal from the transmit transducer to the receive transducer is determined without a workpiece in place, leaving only the water path, and with a workpiece in place, in which case also a transit time responsive signal commensurate with twice the thickness of the workpiece is produced. Knowing the predetermined distance and using the respective transit time responsive signals computing means are employed to determine the velocity of sound in the workpiece. The present arrangement automatically and continuously updates the velocity measurement for changes in the temperature and contamination of the liquid.

7 Claims, 6 Drawing Figures

METHOD AND APPARATUS FOR MEASURING THE VELOCITY OF SOUND IN A WORKPIECE

CROSS REFERENCE TO OTHER APPLICATION

This application is a continuation in-part application of copending application for U.S. Pat. Ser. No. 262,233 filed June 13, 1972 of the same title, now abandoned.

BACKGROUND OF THE INVENTION

In connection with the evaluation of mass produced workpieces, for instance castings, it is desired quite frequently to measure the velocity of sound in the workpiece since a variation of the chemical composition or the grain structure manifests itself as a difference in sound velocity. By accurately determining the velocity of sound it is possible to segregate acceptable workpieces from those which may be deemed rejects. A typical application of this type is the use of ultrasonic measurement for determining the percent of nodularity in cast iron as a function of the speed of ultrasonic sound through the workpieces. Nodular cast iron has considerable strength and is used in a number of large volume applications replacing forgings used previously. Since castings for the most part have irregular surfaces the ultrasonic test is performed by the immersion ultrasonic test technique which comprises immersing the workpiece in a liquid bath and performing ultrasonic velocity measurements while the workpiece is immersed, the liquid, such as water, acting as the coupling medium between the ultrasonic transducers and the workpiece.

The above described technique is revealed, for instance, in U.S. Pat. No. 3,603,136, Milton J. Diamond, dated Sept. 7, 1971, entitled "Ultrasonic Measurement of Material Nodularity". When quantities of castings or other workpieces are tested on a production line basis the temperature of the liquid is apt to change and furthermore, increasing contamination of the liquid is experienced. Both phenomena have marked affect upon the accuracy of measurement which must be carried out with utmost precision to a tolerance of ± 0.5 percent or less. This tolerance is not achievable without constant compensation for variations in the temperature of the liquid as well as for the contamination of the coupling medium. U.S. Pat. No. 3,554,014 issued to Jerry Berg et al, dated Jan. 12, 1971 and assigned to the assignee of this application, reveals an arrangement wherein such compensation for changes in the property of the liquid is made by alternatingly positioning between a pair of spaced transducers a standard and then a workpiece which is to be measured. Therefore, the measurement is continuously compensated and updated for changes occurring in the liquid coupling medium.

It is apparent that the use of a standard which acts as a reference means and which is moved constantly into and out of the measuring position presents a certain amount of complication and, while providing a most successful method for producing accurate data, this heretofore used arrangement nevertheless is inconvenient and time consuming.

BRIEF SUMMARY OF THE INVENTION

The improved arrangement disclosed hereafter dispenses with the use of a "standard" and instead reveals a method wherein during each cycle of operation the transit time of an ultrasonic signal through the liquid bath is measured with the workpiece removed, to compensate for changes in temperature and contamination, and subsequently with the workpiece in place. Three signals are developed which are, a signal corresponding to the transit time of the acoustic signal through the liquid couplant, a signal corresponding to the transit time of the ultrasonic signal through the liquid and the workpiece, and finally, a signal corresponding to the transit time of the ultrasonic signal for one round trip in the workpiece. By determining the fixed distance between the two ultrasonic transducers, it is readily possible, using conventional computing means, to determine the velocity of the ultrasonic signal through the workpiece.

Therefore, the above method requires merely that during a first portion of the operating cycle, either before a workpiece is placed in the liquid or after the workpiece has been removed therefrom, an ultrasonic signal is sent from a transmit transducer through the liquid coupling means to a receive transducer, spaced a predetermined distance from the transmit transducer, and that during a second portion of the operating cycle when the workpiece is disposed in the predetermined space an ultrasonic signal is sent once again from the transmit transducer to the receive transducer. Electronic means are coupled to the transmit and receive transducers for providing transit time responsive electrical signals which are processed by computing means in accordance with a formula explained hereafter to produce an indication of the velocity of sound through the workpiece. The computing means, preferably, is a digital computing means which provides the required accuracy and convenience of the mathematical operations.

Further and other significant advantages and improvements will be apparent from the following description when taken in conjunction with the accompanying drawing.

DESCRIPTION OF THE PREFERRED EMBODIMENT

Figure 1A:
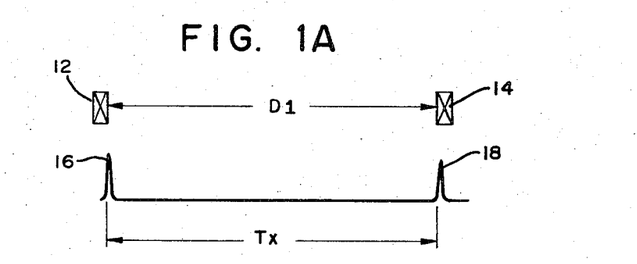
FIGS. 1A and 1B are schematic diagrams showing the physical arrangement of the transducers and workpiece, and the ultrasonic signals obtained.
Figure 1B:
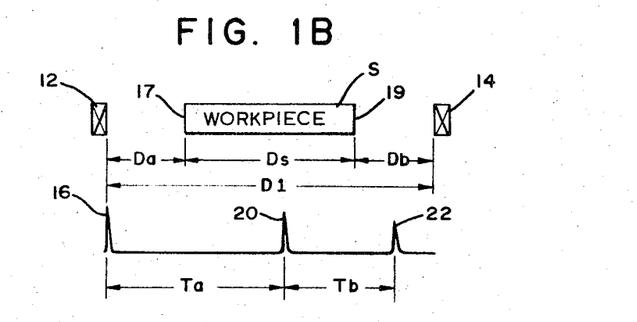

Referring now to the figures and FIGS. 1A and 1B in particular, numeral 12 identifies an electro-acoustic transmit transducer which, upon energization with an electrical signal of suitable amplitude and shape, sends an ultrasonic signal to a receive transducer 14 spaced a fixed distance D1 from the transmit transducer. Both transducers are immersed in a liquid bath, such as water. The ultrasonic signals are preferably in the range between 0.1 and 30 MHz as is well known in the art of ultrasonic testing, see for instance, "Ultrasonic Testing of Materials" (book) by J. & H. Krautkramer, Springer Verlag, New York, N.Y. (1969), pp. 151–227. Numeral 16 identifies the electrical pulse signal applied to the transmit transducer 12 and numeral 18 the electrical signal provided by the receive transducer 14 in response to the receipt of the ultrasonic signal. The interval between the signals 16 and 18 represents the transit time T$x$ required by the ultrasonic signal to traverse the liquid couplant material interposed between the transducers 12 and 14, distance D$l$. The transmit transducer may be operated at a pulse repetition frequency of several hundred or thousand Hertz in order to provide an averaged value for the transit time T$x$.

Referring now to FIG. 1B, a workpiece S has been placed into the liquid couplant material so that the respective end faces 17 and 19 of the workpiece S are acoustically coupled through the couplant to the transducers 12 and 14. The workpiece has a length D$s$, the distance between the transmit transducer 12 and the end face 17 of the workpiece is identified as D$a$ and the distance from the receive transducer 14 to the other end face 19 is identified as D$b$. The distance D$l$ between the transducers 12 and 14 remains unaltered. Upon energizing the transmit transducer 12 with an electrical pulse signal 16, an ultrasonic signal is produced which traverses the distance D$a$, the distance D$s$ of the workpiece and the distance D$b$, manifesting itself as an electrical signal 20 at the receive transducer 14. The transit time T$a$ indicative of the ultrasonic signal traversing the distance D$l$ with the workpiece in place is less than the transit time T$x$ since the velocity of sound in metal is many times greater than that in liquid.

As the ultrasonic signal exits from the end surface 19 of the workpiece a reflection signal is generated which is transmitted to the opposite end surface 17, reflected from there again to the end surface 19, and after traversing the distance D$b$ is sensed by the receive transducer 14, see signal 22. The signal 22 which is sensed by the receive transducer 14 a brief time interval after the receipt of the first signal 20, therefore, is delayed by the round trip time of the ultrasonic signal through the workpiece, or twice the length D$s$ of the workpiece. Hence, the time interval T$b$ is a measure of the transit time of the ultrasonic signal traversing twice the thickness of the workpiece interposed between the transducers 12 and 14.

By mathematics, it can be shown that determining the value of D$l$, a predetermined distance, and ascertaining the values for T$x$, T$a$, T$b$ is sufficient for obtaining the velocity of sound V$s$ in the workpiece.

It will be apparent, therefore, that each cycle of operation requires essentially two portions, namely transmitting an ultrasonic signal or signals from the transducer 12 to the transducer 14 with the workpiece removed from the space D$l$ and a second portion again transmitting an ultrasonic signal or signals through the distance D$l$ with the workpiece S in place. The distance D$l$ is predetermined and remains unaltered so that during the operation just described values for T$x$, T$a$ and T$b$ are derived which then are fed to a computing means for calculating the value V$s$, the velocity of sound in the workpiece S under test. This procedure results in a steady updating and correction for whatever changes may occur in the liquid couplant material.

The following definitions have been adopted and are applicable to the calculations below.

D$l$ - predetermined distance between transmit transducer and receive transducer;
D$a$ - distance from transmit transducer to opposing end surface of workpiece;
D$b$ - distance from receive transducer to opposing surface of workpiece;
D$s$ - thickness of workpiece interposed between transducers;
T$a$ - transit time of ultrasonic signal traversing distance from transmit transducer to receive transducer through liquid bath with workpiece disposed between transducers;
T$b$ - transit time of ultrasonic signal through twice the thickness of workpiece along path from transmit transducer to receive transducer;
T$x$ - transit time of ultrasonic signal from transmit transducer through liquid couplant (distance D$l$) to receive transducer;
V$c$ - velocity of sound in couplant;
V$s$ - velocity of sound in workpiece.

The velocity of sound in the liquid couplant is:
$$Vc = Dl/Tx \qquad (1)$$

also:
$$Da + Db = Vc\,(Ta - Tb/2) = Dl/Tx\,(Ta - Tb/2) \qquad (2)$$

also from FIG. 1B it is evident that:
$$Ds = Dl - (Da + Db) = Dl\,[1 - (Ta - Tb/2/Tx)] \qquad (3)$$

The velocity of sound in the workpiece is:
$$Vs = Ds/(Tb/2) \qquad (4)$$

$$Ds = [Tx - (Ta - Tb/2)]Dl/Tx \qquad (5)$$

substituting (4) in (5)
$$Vs = (Tx - Ta + Tb/2)Dl/Tx(Tb/2) \qquad (6)$$

Figure 2:
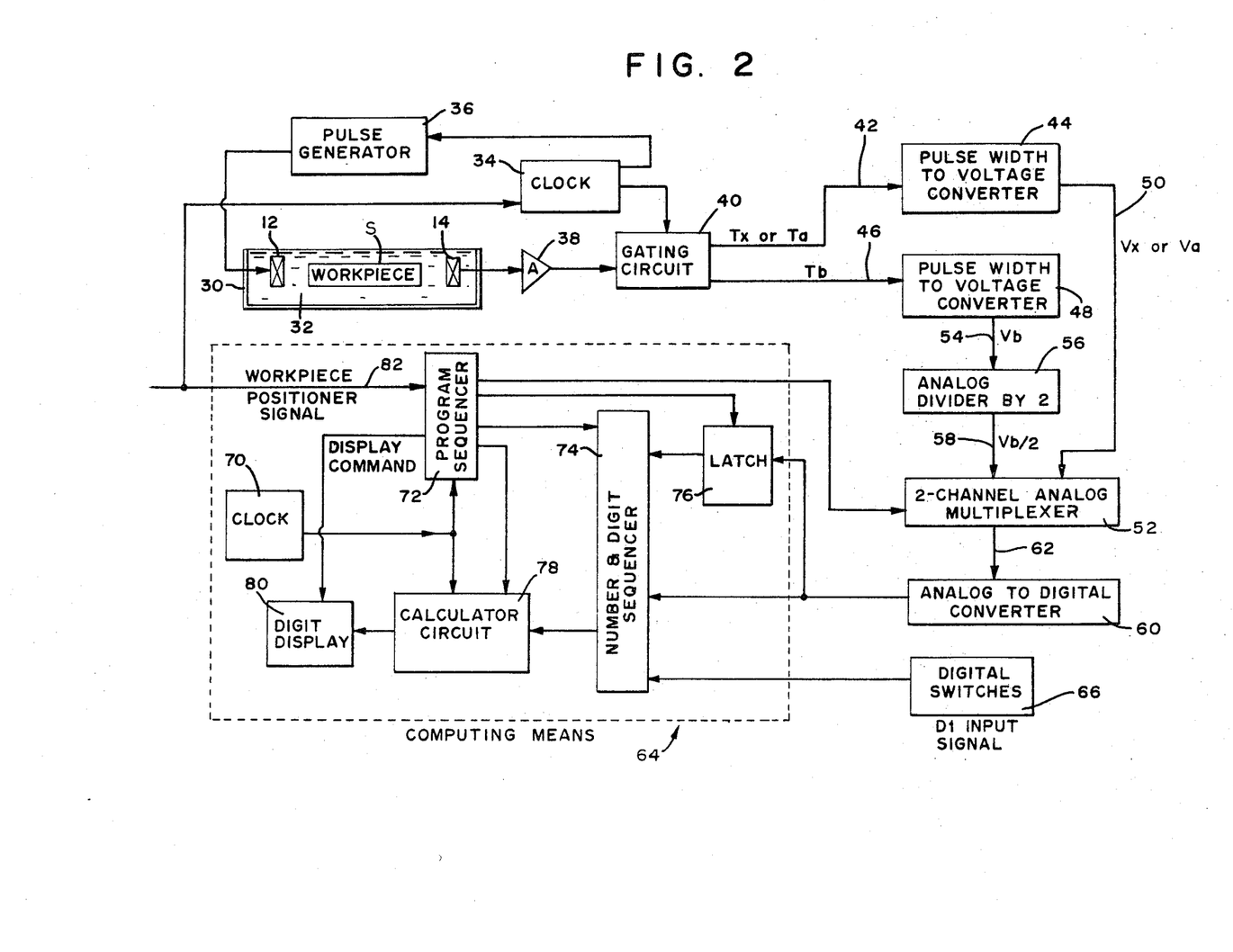
FIG. 2 is a schematic electrical circuit diagram showing the processing of the signals obtained.

Referring now to FIG. 2 there is shown schematically an enclosure 30 containing a liquid couplant 32, such as water, a transmit transducer 12, a receive transducer 14 and a workpiece S. It shall be understood that the workpiece S is removably inserted into the liquid 32 by transport means, not shown, and that cyclically the workpiece S to be tested is withdrawn from the bath and a new workpiece put in place. A clock or synchronizer 34 is electrically coupled to an electrical pulse generating means 36 to cyclically provide an electrical high frequency pulse signal to the transducer 12 which, in response thereto, provides an ultrasonic signal which traverses the bath 32, with or without workpiece in the bath, and is received shortly thereafter by the receive transducer 14. The receive transducer 14 transforms the acoustic signal to an electrical signal which is amplified by an amplifier 38 and transmitted to a gating circuit 40 (see FIG. 3) which is also coupled to the clock 34. The gating circuit 40 provides a pulse having a width equal to the transit time T$x$ when no workpiece is disposed in the bath, and a pulse having a width responsive to the transit time T$a$, see FIG. 1A and FIG. 1B, when the workpiece S is in place as shown in FIG. 2. These pulses are fed via conductor 42 to a pulse width to voltage converter 44. When the workpiece is in place there is also generated a further pulse responsive to the time interval T$b$, FIG. 1B, which is fed via the conductor 46 to a further pulse width to voltage converter 48. The converter circuits 44 and 48 provide voltages whose amplitudes are commensurate with the width of the received pulses. The pulse width to voltage converter 44 is connected via conductor 50 to a two-channel analog multiplexer circuit 52 for receiving a signal V$x$ or V$a$, which correspond to analog voltages responsive to the transit time T$x$ or T$a$ respectively.

The converter unit 48 is connected via conductor 54 to an analog scaling circuit 56 for dividing the voltage signal V$b$, corresponding to the time interval T$b$, by a factor of two and feeding the resulting signal V$b$/2 via conductor 58 to the multiplexer circuit 52.

An analog to digital converter unit 60 is connected to the multiplexer circuit 52 via conductor 62 to convert the previously generated analog voltage signals to digital information which then is fed to a digital computing means 64. There is provided, furthermore, a digital input means 66, such as manually operable switches, for feeding into the computing means 64 digital information corresponding to the predetermined distance between the transducers 12 and 14, that is the distance D$l$. This distance can be measured accurately by gauge blocks or calculated as will be indicated later.

The computing means 64 contains standard digital computing components and to this end includes a clock 70, a program sequencer unit 72, a number and digit sequencer circuit 74, a latching means 76, a calculating circuit 78, and a digital display unit 80 on which the calculated result is displayed. The computing means is programmed to perform the calculations using the signals corresponding to the values D$l$, T$x$, T$a$ and T$b$ in accordance with the equation (6) hereinabove so that the display means 80 provides a numerical display corresponding to the velocity of sound in the workpiece S. The programming of the interconnected computing means 64 is well within the skill of the art and does not need to be described in detail.

One further input conductor 82 is required and coupled to the program sequencer unit 72 in order to control the sequencer unit in accordance with the presence or absence of a workpiece S disposed in the space between the transducers 12 and 14. In this manner the computing means 64 is controlled to recognize the signals from the analog to digital converter 60 and store a respective signal either as T$x$, T$a$ or T$b$/2 in the memory unit 76 for subsequent computation in equation (6). The signal along conductor 82 is provided either by the workpiece transport means adapted to cyclically place a workpiece into the bath and remove it therefrom or a manually positioned switch. Also, this conductor can be used to start and stop the ultrasonic circuit and the computing means in dependence upon the position of the mechanical material handling device, for instance by using simple cam and limit switch means.

Instead of mechanically measuring the separation of the transducers, it is possible to insert into the space between the transducers a test block of known thickness, adjust the digital input switches 66 for 1.000 inch thickness, using the computing means for dividing the erroneous block thickness into the true block thickness and thus determine the correct value for D$l$, which value is then entered into the computing means 64 by using the input means 66.

As has been indicated heretofore the system can readily by timed so that several hundred or thousand repetitive signal transmissions occur during each portion of the operating cycle, the individual signals being averaged in the pulse width to voltage converter units. In this manner accuracy of measurement is improved and the loss of one or more signals will still maintain the velocity measurement within acceptable accuracy limits. The computing means 64 receives averaged values.

Figure 3:
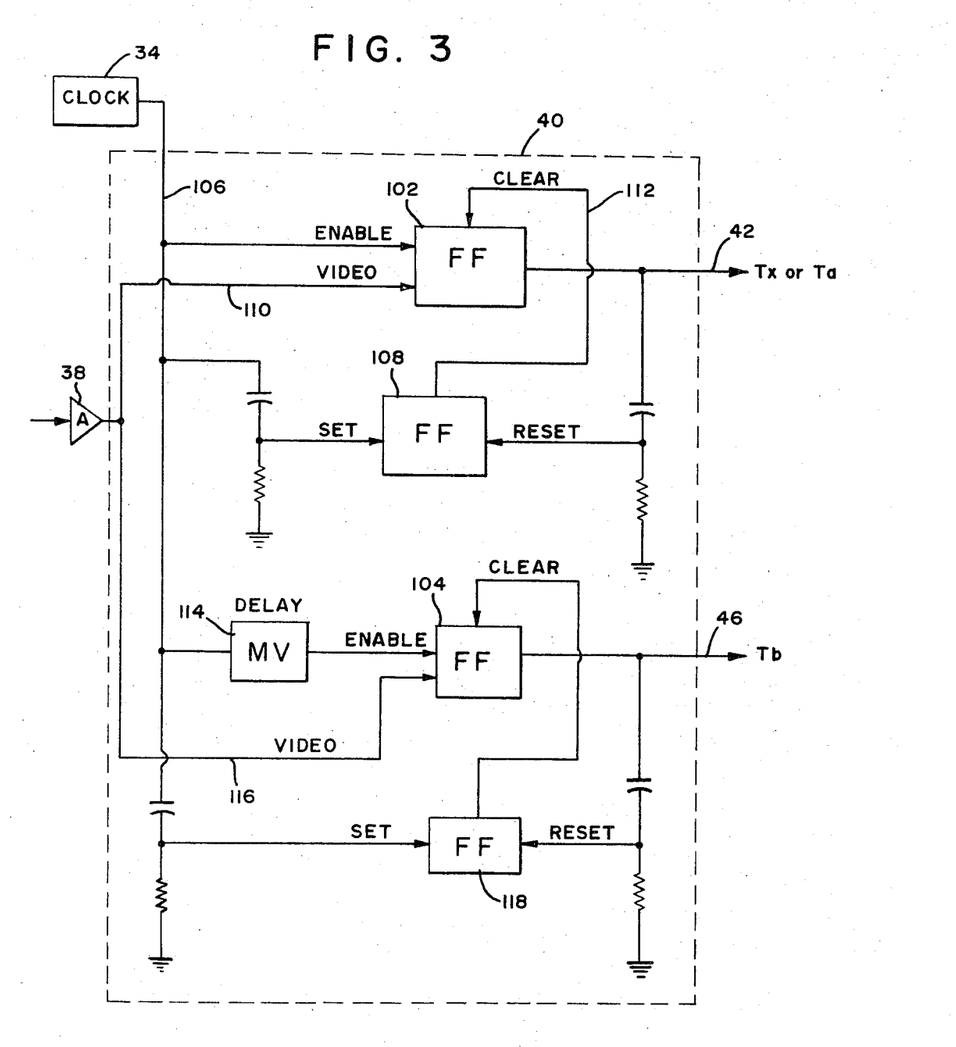
FIG. 3 is a schematic electrical circuit diagram of a suitable gating circuit.

Details of a suitable gating circuit 40 are shown in FIG. 3. At the outset it shall be understood that in the practical embodiment of the circuit the clock circuit 34, pulse generator 36 and video amplifier 38 are contained in a single enclosure. The "main bang" signal which pulses the transmit transducer 12 is so overpowering that the initial pulse is coupled by means of the stray capacitance to the video amplifier 38. Therefore, an actual circuit connection between the pulse generator 36 and the video amplifier 38 is not needed and can be omitted.

The gating circuit 40 comprises principally two flip-flop circuits 102 and 104 for providing the respective time responsive output signals along conductors 42 and 46. The clock 34 cyclically produces a pulse signal along conductor 106 which is applied as an input signal to the flip-flop 102 and to a set/reset flip-flop circuit 108. Hence, the flip-flop 102 is enabled. The following signal (main bang) actuates the flip-flop 102 and the subsequent video signal from the video amplifier 38 stops operation of the flip-flop circuit 102. Hence, the flip-flop circuit 102 provides a signal commensurate with the time interval between the two video signals. The trailing edge of the output signal from the flip-flop circuit 102 along conductor 42 is used as a reset input signal to the set/reset flip-flop circuit 108 which, in turn, produces an output signal along conductor 112 for clearing the flip-flop circuit 102. Depending upon the presence or absence of a workpiece between the transducers 12 and 14, the signal along conductor 42 is either a signal denoting the transit time T$x$ or T$a$. Since a workpiece position responsive signal from the workpiece transport means is applied to the program sequencer 72 of the computing means 64, the signal will be recognized as to its T$a$ or T$x$ character.

The clock signal along conductor 106 is applied also to a one-shot multivibrator circuit 114 which acts as a time delay circuit having a delay of sufficient duration to prevent the clock and the first signal appearing at the video amplifier 38 (main bang) from actuating the flip-flop circuit 104. The clock signal is also used as a set signal for the flip-flop circuit 118. The following video signal from the video amplifier 38, transmitted along conductor 116, actuates the flip-flop circuit 104. The subsequent video signal along the conductor 116 stops operation of the flip-flop circuit 104, hence providing a measure of the time lapse between the two signals commensurate with the thickness of the workpiece. The trailing edge of the output signal along conductor 46 is used as a reset signal for the set/reset flip-flop circuit 118, causing the latter to provide a clearing signal which is applied to the flip-flop circuit 104.

Both flip-flop circuits 102 and 104 most suitably are commercially available units, such as J-K flip-flop circuits made by Fairchild Semiconductor Company under part No. 9001.

Figure 4:
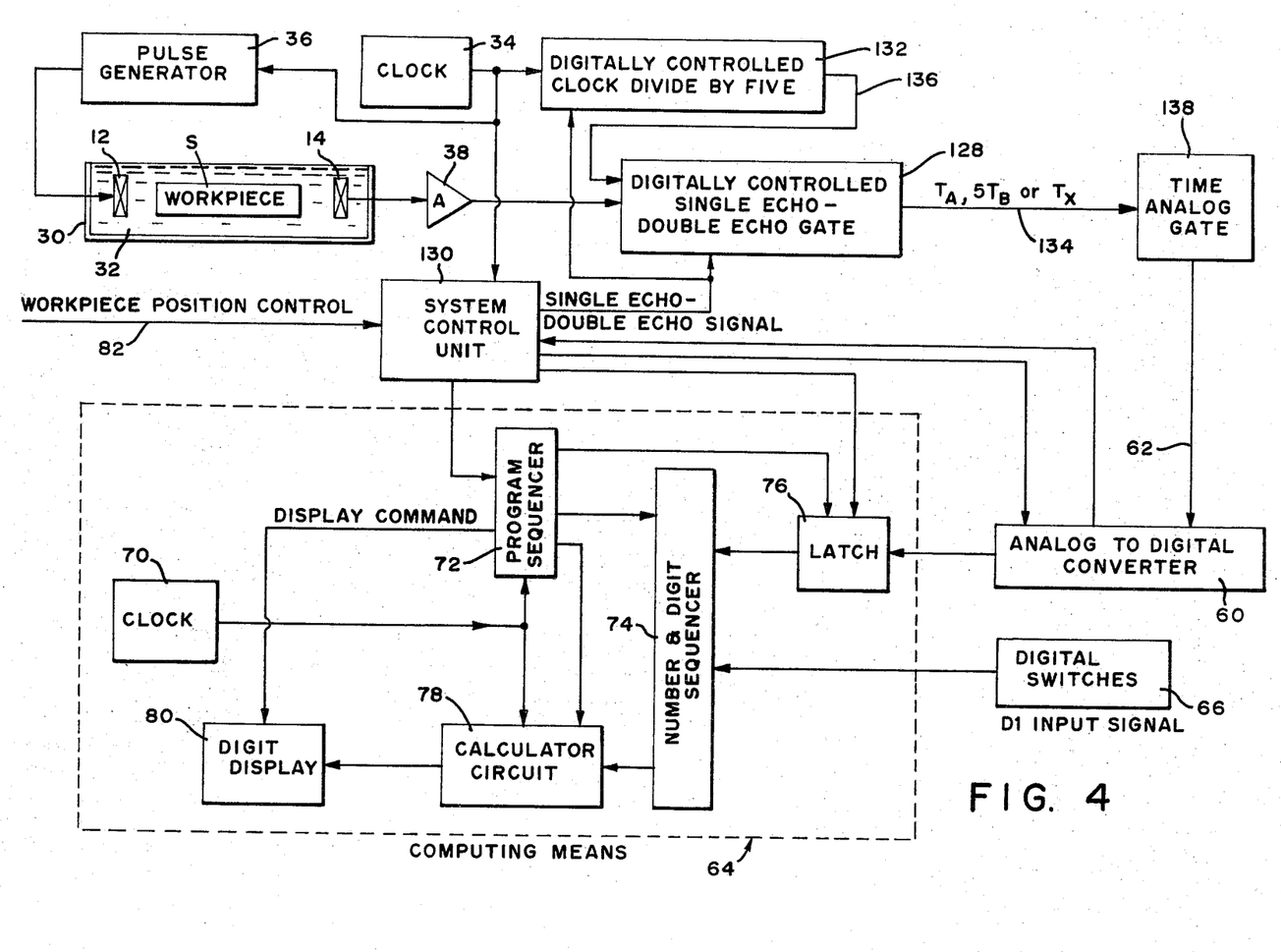
FIG. 4 is a schematic electrical circuit diagram showing an alternative embodiment.

In an alternative embodiment of the invention, referring to FIG. 4, there is shown schematically an enclosure 30 containing a liquid couplant 32, such as water, a transmit transducer 12, a receive transducer 14 and a workpiece S. It shall be understood that the workpiece S is removably inserted into the liquid 32 by transport means, not shown, and that cyclically the workpiece S to be tested is withdrawn from the bath and a new workpiece put in place. A clock or synchronizer 34 is electrically coupled to an electrical pulse generative means 36 to cyclically provide an electrical high frequency pulse signal to the transducer 12 which, in response thereto, provides an ultrasonic signal which traverses the bath 32, with or without a workpiece in the bath, and is received shortly thereafter by the receive transducer 14. The receive transducer 14 transforms the acoustic signal to an electrical signal which is amplified by a video amplifier 38 and transmitted to a digitally controlled single echo-double echo gate 128 (see FIG. 5) which is also coupled to a system control unit 130 and a digitally controlled clock divide by five unit 132. The single echo-double echo gate 128 provides a pulse having a width responsive to the transit time $T_x$ when no workpiece is disposed in the bath, and a pulse having a width responsive to the transmit time $T_a$, see FIG. 1A and FIG. 1B, when the workpiece S is in place as shown in FIG. 4. When the workpiece is in place there is also a further pulse having a width responsive to time interval $T_b$, see FIG. 1B.

The system control unit 130 provides sequencing information for the velocity measurement system. The system control unit 130 receives a workpiece position control signal (either from the transport means via conductor 82 or a manually operable switch), a clock signal from clock unit 34, and a signal from the analog to digital converter 60. The system control unit 130 provides as output a single echo-double echo logic level signal to both the digitally controlled single echo-double echo gate unit 128 and to the digitally controlled clock divide by five unit 132. The single echo-double echo signal will be in its "low" state when the system is measuring $T_a$ or $T_x$ and will be in its "high" state when the system is measuring $T_b$. The terms high and low state refer to the two output levels of commercially available TTL digital integrated circuits. The high and low levels are typically 3.5 Volts and zero Volts respectively. In the single echo-double echo unit 128 the single echo-double echo signal either enables a logic gate which causes the output signal on conductor 134 to be responsive to either $T_x$ or $T_a$, depending upon the state of the workpiece position control signal, or inhibits a logic gate which causes the output signal to be responsive to the transit time $T_b$. In the clock divide by five unit 132 the single echo-double echo signal causes the clock signal frequency provided by conductor 136 to the single echo-double echo gate unit 128 to be divided by a factor of five when measuring $T_a$ and $T_x$ and to remain unchanged when measuring $T_b$.

The signal provided along conductor 134, either $T_a$, $T_x$ or $5T_b$ depending upon the timing sequence in the system control unit 130, is provided to the time analog gate 138. The time analog gate 138 integrates the pulse signal with respect to time and averages the values to obtain an analog output signal whose amplitude is responsive to the input signal pulse width. The averaging process may be performed over several hundred or thousand repetitive signal transmissions occurring during each portion of the operating cycle. In this manner any erroneous signals due to random or spurious noise, loss of signal, etc., will not influence the resultant output signal, thereby maintaining the velocity measurement within acceptable accuracy and resolution limits.

The analog voltage output from the time analog gate 138 is fed to the analog to digital converter unit 60 for conversion to digital signals compatible with the computing means 64. The signals for controlling the reset and read commands to the analog to digital converter 60 are provided by the system control unit 130. The output signal from the analog to digital converter 60 is applied to the latch unit 76 in the computing means 64. The system control unit 130 provides a signal to the latch unit 76 to store the signal from the analog to digital converter 60 in the proper storage for $T_a$, $T_x$ or $5T_b$.

The digital input switches 66 are adjusted in the aforementioned manner to provide the computing means 64 with a correct value for $Dl$, which value is then entered into the computing means 64 by using the input means 66.

The system control unit 130 also provides a signal to the program sequencer 72 in the computing means 64, said signal causing the computing means to perform the mathematical computation in equation (6). The computing means 64 will shift the decimal point when storing the value $5T_b$, thereby storing the value of $T_b/2$ required in equation (6).

Figure 5:
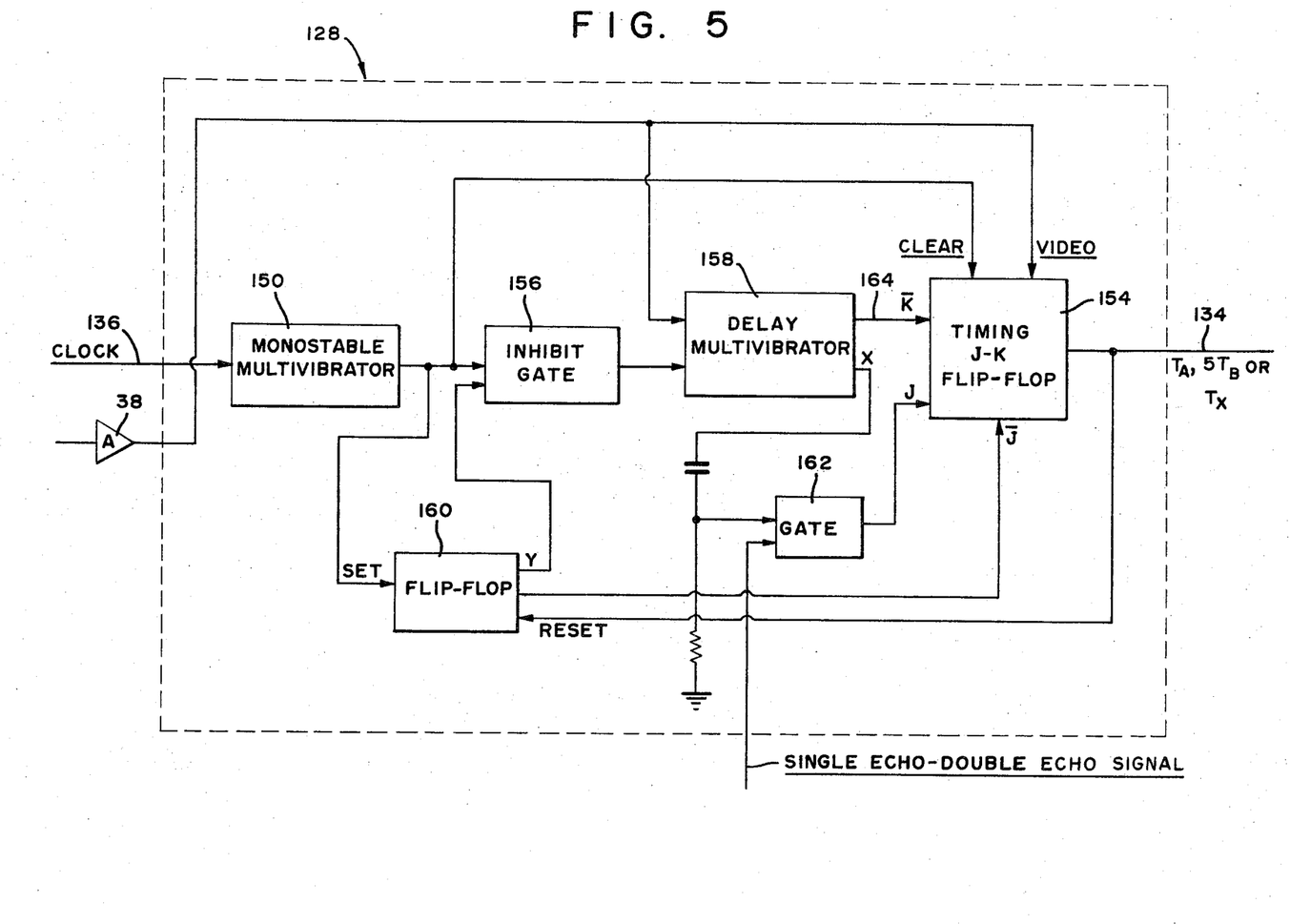
FIG. 5 is a schematic electrical circuit diagram of a suitable digitally controlled single echo-double echo gate.

A schematic electrical circuit diagram of a suitable digitally controlled single echo-double echo gate unit 128 is shown in FIG. 5. A clock pulse from the digitally controlled clock divide by 5 unit is provided by means of conductor 136 to monostable multivibrator 150. After a delay, greater than the monostable multivibrator 150 delay, the pulse generator provides a high frequency pulse to the transmit transducer, referred to as the main bang signal. The main bang signal is so overpowering that the initial pulse is coupled by means of the stray capacitance to the video amplifier. The monostable multivibrator 150 output remains in the low state after receiving the clock pulse until shortly before the main bang. The delay is necessary to avoid the processing of a noise signal as the main bang signal. The monostable multivibrator 150 causes the inhibit gate 156 output to be in the high state which in turn inhibits operation of the delay multivibrator 158. After the delay of the multivibrator 150 the output of the monostable multivibrator 150 goes to the high state, at which time the output of the inhibit gate 156 assumes the low state. Concurrently, the Y-output of the set/reset flip-flop 160 remains in the high state, the timing J-K flip-flop 154 is cleared by the output from the multivibrator 150 and the J-input of the timing flip-flop 154 remains in the low state.

In the single echo mode, when measuring the values of $T_x$ and $T_a$, the single echo-double echo signal from the system control unit 130 to the gate 162 is in the low state and the output of gate 162 (the J-input to the timing J-K flip-flop 154) is always in the high state.

The main bang signal from the video amplifier causes the output of the delay multivibrator 158 on conductor 164 to be in the low state resulting that the output from timing J-K flip-flop 154 assumes the high state. The pulse width of the delay multivibrator 158 is of a sufficiently short duration to enable the output from the multivibrator 158 to return to the high state before any subsequent video signals are received. The subsequent video signal (the signal after the main bang), which is the input clock signal of the timing J-K flip-flop 154, returns the output of the timing J–K flip-flop 154 to the low state. The trailing edge of the output pulse from the J–K flip-flop 154 resets the set/reset flip-flop 160 and the reset condition of the flip-flop 160 causes the J-input to the timing J–K flip-flop to revert to its high state.

The output pulse width from the timing J–K flip-flop 154 is responsive to the transit time T$a$ or T$x$ and is provided to the time analog gate by means of conductor 134 for further processing as heretofore described.

In order to measure the transit time responsive to T$b$, the single echo-double echo signal is in the high state. The digitally controlled single echo-double echo gate 128 functions as described heretofore with several differences. The output of gate 162, and therefore the J-input of the timing J–K flip-flop 154 is now responsive to the X-output of the delay multivibrator 158. The output of gate 162 is normally in the low state so that when the first video pulse (main bang) is received, the output of the timing J–K flip-flop 154 will remain in the low state. Upon receiving the main bang video pulse the delay multivibrator 158 assumes its low state causing a positive pulse at the output of gate 162. The subsequent video signal received causes the output of the timing J–K flip-flop 154 to assume its high state. The following video signal to the timing J–K flip-flop 154 causes the output of the timing J–K flip-flop 154 to revert to the low state and resets the other circuits 154, 156 and 160 as describesd heretofore. The resulting output positive pulse from circuit 154, responsive to the transit time 5T$b$, is provided via conductor 134 to the time analog gate as described above. The device 154 is a commercially available J–K flip-flop with buffered clock input.

It will be apparent that the present embodiments provide a significant improvement over the known arrangements and are characterized by utmost simplicity and ease of operation. The present embodiments provide automatic and continuous updating of the variable T$x$ in the computer means. Tests have shown that the method and apparatus disclosed provides most accurate and reliable results.

What is claimed is:

1. Apparatus for measuring the velocity of sound in a workpiece immersed in a liquid bath by the ultrasonic pulse-echo method comprising:
   a body of liquid;
   a transmit transducer and a receive transducer disposed in said body of liquid and spaced a predetermined distance (D$l$) from one another;
   electrical circuit means coupled to said transmit transducer and said receive transducer for producing during a first time interval a first electrical signal (T$x$) commensurate with the transit time of an ultrasonic pulse signal traversing said predetermined distance from said transmit transducer through said liquid to said receive transducer; and for producing during a second time interval during which a workpiece is disposed in said body of liquid and said transducers, separated by said distance, are acoustically coupled through said liquid to opposite sides of the workpiece a second electrical signal (T$a$) commensurate with the transit time of an ultrasonic pulse signal from said transmit transducer through the liquid and workpiece to said receive transducer, and a third electrical signal (T$b$) commensurate with one round trip transit time of the ultrasonic pulse signal in the workpiece;
   means for producing a fourth electrical signal commensurate with said predetermined distance (D$l$);
   means for producing a control signal indicative of the presence and absence of a workpiece in said body of liquid for denoting the condition when providing said first, second and third signals, and
   computer means coupled for receiving said first, second, third and fourth signals and receiving also said control signal providing identification of said first, second and third signals for providing an output signal (V$s$) commensurate with the velocity of the ultrasonic signal in the workpiece in accordance with the formula:

V$s$ = D$l$(T$x$ − T$a$ + T$b$/2)/T$x$(T$b$/2)

2. Apparatus for measuring the velocity of sound in a workpiece as set forth in claim 1, said electrical signals corresponding to T$x$, T$a$ and T$b$ being produced as analog signals; means for receiving said analog signals and converting them to digital signals, and said computer means adapted to process digital signals.

3. Apparatus for measuring the velocity of sound in a workpiece as set forth in claim 1, said body of liquid comprising water.

4. Apparatus for measuring the velocity of sound in a workpiece immersed in a liquid bath by the ultrasonic pulse-echo method comprising:
   an enclosure;
   a body of liquid at least partially filling said enclosure;
   a transmit transducer and a receive transducer disposed in said body of liquid and spaced at a predetermined distance D$l$ from one another;
   means for disposing a workpiece whose velocity of sound is to be measured in the bath and spaced between said transducers;
   electrical pulse generating means coupled to said transmit transducer for causing said transmit transducer to cyclically send an ultrasonic pulse through said distance D$l$ to said receive transducer;
   electrical circuit means which include a gating means coupled to said transmit and receive transducers for producing during a time interval when no workpiece is disposed in said distance an electrical signal T$x$ commensurate with the transit time of the ultrasonic pulse through said distance, and for producing during a time interval when a workpiece is disposed in said distance electrical signals T$a$ and T$b$ commensurate respectively with the transit time of the ultrasonic pulse through said liquid and workpiece and to twice the transit time of the ultrasonic pulse through the workpiece dimension interposed in the path of said pulse from said transmit transducer to said receive transducer;
   circuit means which include pulse width to voltage converters coupled for receiving said electrical signals and providing in response thereto further electrical signals whose amplitude is commensurate respectively with the values of T$x$, T$a$ and T$b$;
   means coupled for receiving said signal commensurate with T$b$ and processing it to produce a signal commensurate with T$b$/2;
   analog to digital conversion means coupled for receiving the signals commensurate with T$x$, T$a$ and T$b$/2 and providing corresponding digital output signals;

means for producing a digital signal whose amplitude is commensurate with said predetermined distance D$l$;

means for producing a control signal indicative of the presence and absence of a workpiece in said body of liquid and spaced between said transducers for denoting the condition when providing the respective signals T$x$, T$a$ and T$b$, and digital computing means coupled for receiving said digital output signals, said digital signal commensurate with the value D$l$, and said control signal, and said computing means being adapted to provide and display a value V$s$ indicative of the velocity of sound in the workpiece by performing calculations in accordance with the equation:

V$s$ = D$l$(T$x$ − T$a$ + T$b$/2)/T$x$(T$b$/2)

5. A method for determining the velocity of sound in workpieces fed sequentially to a workstation comprising:

a. providing at said workstation a liquid bath and placing a transmit electro-acoustic transducer and a receive electro-acoustic transducer in said bath at a predetermined distance D$l$ from each other;

b. providing an electrical signal commensurate with the distance D$l$;

c. cyclically performing the following steps for each workpiece fed sequentially to the workstation:

c1. when the respective workpiece to be tested is absent in said predetermined distance D$l$ transmitting an acoustic signal from the transmit transducer to said receive transducer and generating an electrical signal T$x$ commensurate with the transit time of the acoustic signal through said distance D$l$, and c2. when the respective workpiece to be tested is disposed in said distance D$l$ transmitting an acoustic signal from the transmit transducer through the liquid and workpiece to the receive transducer and generating an electrical signal T$a$ commensurate with the transit time of the acoustic signal through the liquid bath and workpiece, and generating also a signal T$b$ commensurate with the transit time of the acoustic signal through twice the dimension of the workpiece in line of the path of the acoustic signal path from the transmit transducer to the receive transducer;

d. providing a control signal indicative of the presence and absence of a workpiece in said distance D$l$ to denote the cyclically generated signals as T$x$ or T$a$ and T$b$ respectively, and e. supplying said signals D$l$, T$x$, T$a$, T$b$ and said control signal to computing means for computing the velocity V$s$ of sound in the respective workpiece in accordance with the formula:

V$s$ = D$l$(T$x$ − T$a$ + T$b$/2)/T$x$(T$b$/2)

6. A method for determining the velocity of sound in a workpiece as set forth in claim 5, said computing being performed digitally.

7. A method for determining the velocity of sound in a workpiece as set forth in claim 6, said acoustic signals being in the ultrasonic frequency range.

* * * * *

UNITED STATES PATENT OFFICE
CERTIFICATE OF CORRECTION

Patent No. 3,848,460     Dated November 19, 1974

Inventor(s) WALTER J. BANTZ, JOHN W. COUTURE, RICHARD J. PITTARO

It is certified that error appears in the above-identified patent and that said Letters Patent are hereby corrected as shown below:

Change "$D\ell$" to read $\underline{D1}$ at the following occurrences:

Column 3, lines 21, 29, 49, 56, 58, 59;

Column 4, lines 1, 22, 25, 28 (twice), 33, 36;

Column 5, lines 20, 30, 61;

Column 8, line 17;

Column 9, line 51;

Column 10, lines 4, 17, 36, 43;

Column 11, lines 5, 13, 18, 25, 27, 31, and

Column 12, lines 3, 5, 19, 21, 25.

Signed and sealed this 14th day of January 1975.

(SEAL)
Attest:

McCOY M. GIBSON JR.
Attesting Officer

C. MARSHALL DANN
Commissioner of Patents